(12) United States Patent
Atchison et al.

(10) Patent No.: US 11,768,000 B2
(45) Date of Patent: Sep. 26, 2023

(54) SYSTEM AND METHOD TO OPERATE HVAC SYSTEM DURING VOLTAGE VARIATION EVENT

(71) Applicant: Johnson Controls Technology Company, Auburn Hills, MI (US)

(72) Inventors: Shaun B. Atchison, Wichita, KS (US); Theresa N. Gillette, Wichita, KS (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 0 days.

(21) Appl. No.: 16/828,813

(22) Filed: Mar. 24, 2020

(65) Prior Publication Data

US 2021/0302039 A1    Sep. 30, 2021

(51) Int. Cl.
| | |
|---|---|
| *G05B 15/02* | (2006.01) |
| *F24F 11/32* | (2018.01) |
| *F24F 11/52* | (2018.01) |
| *F24F 11/56* | (2018.01) |
| *F24F 11/65* | (2018.01) |
| *F24F 11/64* | (2018.01) |
| *F24F 140/60* | (2018.01) |
| *F24F 140/50* | (2018.01) |

(52) U.S. Cl.
CPC ............ *F24F 11/32* (2018.01); *F24F 11/52* (2018.01); *F24F 11/56* (2018.01); *F24F 11/64* (2018.01); *F24F 11/65* (2018.01); *G05B 15/02* (2013.01); *F24F 2140/50* (2018.01); *F24F 2140/60* (2018.01)

(58) Field of Classification Search
CPC .. F24F 11/32; F24F 11/62; F24F 11/46; F24F 11/52; F24F 11/63; F24F 11/64; F24F 11/38; G05B 23/0232; G05B 19/0423; G05B 2219/34477; G05B 23/0221; G05B 23/0254; G05B 19/406; G05B 2219/34474; G01R 19/2513; G01R 19/02; G01R 31/50; H04L 43/16; H04L 41/0681; H04L 41/142; G06F 11/0766
See application file for complete search history.

(56) References Cited

U.S. PATENT DOCUMENTS

| | | | | |
|---|---|---|---|---|
| 5,170,359 | A * | 12/1992 | Sax | G10L 25/48 324/102 |
| 5,512,883 | A * | 4/1996 | Lane, Jr. | F25D 21/008 702/59 |
| 6,018,300 | A * | 1/2000 | Dowden | H04L 43/16 714/763 |
| 6,341,493 | B1 * | 1/2002 | Shepeck | G08C 19/18 62/129 |
| 7,490,145 | B2 * | 2/2009 | Sylor | H04L 43/00 709/224 |
| 8,368,337 | B2 | 2/2013 | Bonilla et al. | |
| 9,331,474 | B1 * | 5/2016 | Mallik | H03K 17/0828 |
| 9,459,304 | B1 * | 10/2016 | Parkin | G01R 31/52 |
| 9,644,856 | B1 | 5/2017 | Francis et al. | |
| 9,702,939 | B2 * | 7/2017 | Brockman | H02J 7/0031 |

(Continued)

*Primary Examiner* — Darrin D Dunn
(74) *Attorney, Agent, or Firm* — Fletcher Yoder, P.C.

(57) ABSTRACT

A controller for a heating, ventilation, and/or air conditioning (HVAC) system is configured to detect an input voltage received as a power supply by the HVAC system, determine the input voltage exceeds a threshold value, and identify a voltage variation event based on determining that the input voltage exceeds the threshold value.

20 Claims, 9 Drawing Sheets

(56) References Cited

U.S. PATENT DOCUMENTS

| | | | | |
|---|---|---|---|---|
| 10,353,375 B2* | 7/2019 | Tanaka | | B23Q 5/58 |
| 11,035,246 B2* | 6/2021 | Zhu | | F01D 21/003 |
| 11,125,603 B2* | 9/2021 | Bregani | | G01F 23/74 |
| 11,210,172 B2* | 12/2021 | Lambert | | G06F 11/0766 |
| 2002/0067273 A1* | 6/2002 | Jaques | | G08B 21/22 |
| | | | | 340/573.4 |
| 2007/0170171 A1* | 7/2007 | Shah | | G01R 19/0084 |
| | | | | 219/497 |
| 2010/0128404 A1* | 5/2010 | Gass | | H02H 3/20 |
| | | | | 361/91.1 |
| 2010/0175015 A1* | 7/2010 | Lagnelov | | G05B 23/0232 |
| | | | | 715/771 |
| 2012/0323396 A1* | 12/2012 | Shelton | | H02J 3/381 |
| | | | | 700/297 |
| 2013/0107401 A1* | 5/2013 | Helt | | H02H 7/09 |
| | | | | 361/33 |
| 2014/0034284 A1* | 2/2014 | Butler | | F24F 11/30 |
| | | | | 165/207 |
| 2014/0163759 A1 | 6/2014 | Anderson et al. | | |
| 2014/0214214 A1* | 7/2014 | Asmus | | G01D 3/021 |
| | | | | 700/276 |
| 2014/0268458 A1* | 9/2014 | Luciani | | H02H 3/10 |
| | | | | 361/86 |
| 2014/0365179 A1* | 12/2014 | Horowitz | | G05B 23/0254 |
| | | | | 702/185 |
| 2015/0130622 A1* | 5/2015 | Scuka | | H02H 3/24 |
| | | | | 340/635 |
| 2015/0371418 A1* | 12/2015 | Laycock | | G06T 11/206 |
| | | | | 345/440 |
| 2016/0204614 A1* | 7/2016 | Itaya | | H02J 13/00006 |
| | | | | 307/82 |
| 2016/0290668 A1* | 10/2016 | Taylor | | F24F 11/62 |
| 2017/0054287 A1* | 2/2017 | Jayanth | | G01R 31/343 |
| 2018/0121390 A1* | 5/2018 | Tzabari | | G06K 9/00536 |
| 2018/0275199 A1* | 9/2018 | Parkin | | G01R 31/346 |
| 2018/0307403 A1* | 10/2018 | St-Jean | | G06T 11/206 |
| 2018/0314238 A1* | 11/2018 | Fujita | | G05B 23/0232 |
| 2018/0314243 A1* | 11/2018 | Fujita | | G05B 19/418 |
| 2019/0264935 A1* | 8/2019 | Taylor | | F24F 11/30 |
| 2020/0410839 A1* | 12/2020 | Bickel | | H02J 3/00125 |
| 2021/0103006 A1* | 4/2021 | Menzel | | G05B 13/00 |

* cited by examiner

SYSTEM AND METHOD TO OPERATE HVAC SYSTEM DURING VOLTAGE VARIATION EVENT

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. The HVAC system may receive power from a power source in order to operate. For example, the power source may be an electrical utility grid or a generator that is separate from the HVAC system. The HVAC system may continuously receive an input voltage from the power source to power HVAC system components that enable conditioning of the supply air flow. However, in some circumstances, the input voltage received from the power source may not enable the HVAC system to operate in a desirable manner. For example, a received input voltage may deviate from an expected input voltage and may affect the operation of the HVAC system.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a controller for a heating, ventilation, and/or air conditioning (HVAC) system is configured to detect an input voltage received as a power supply by the HVAC system, determine the input voltage exceeds a threshold value, and identify a voltage variation event based on determining that the input voltage exceeds the threshold value.

In one embodiment, a non-transitory, computer-readable medium includes computer-executable instructions that, when executed by processing circuitry, are configured to cause the processing circuitry to detect an input voltage received by a heating, ventilation, and/or air conditioning (HVAC) system, compare the input voltage to a range of voltage values, determine the input voltage is outside of the range of voltage values, and identify a voltage variation event based on determining that the input voltage is outside of the range of voltage values.

In one embodiment, a heating, ventilation, and/or air conditioning (HVAC) system includes a compressor and a controller communicatively coupled to the compressor and having a tangible, non-transitory, computer-readable medium with computer-executable instructions. The instructions, when executed by a processing circuitry, are configured to cause the processing circuitry to determine an input voltage value of an input voltage received as a power supply by the HVAC system, identify a voltage variation event based on determining that the input voltage value is outside of a range of voltage values, and operate the HVAC system based on identifying the voltage variation event.

DRAWINGS

Various aspects of this disclosure may be better understood upon reading the following detailed description and upon reference to the drawings in which.

DETAILED DESCRIPTION

Figure 1:
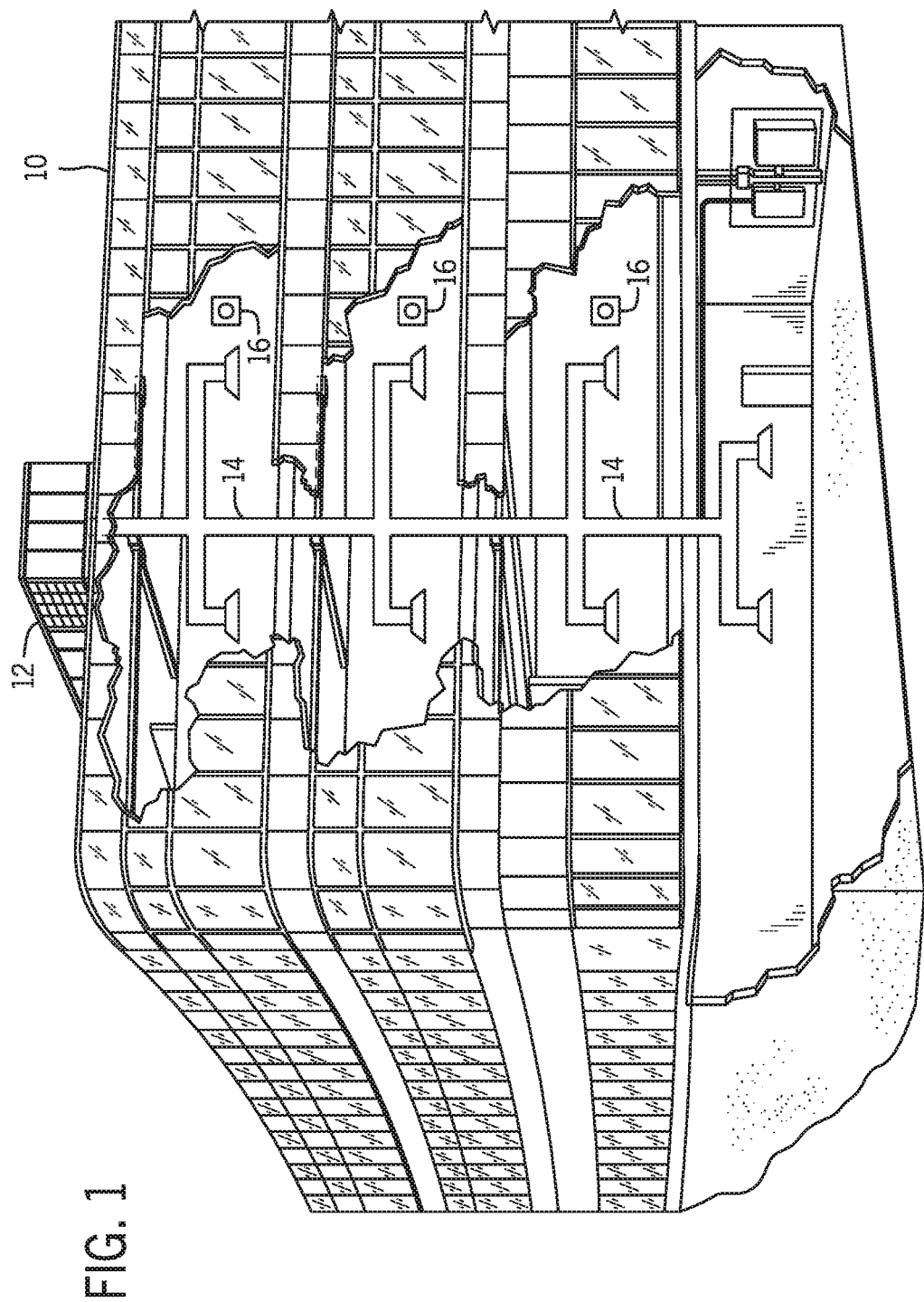
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may be operated via electrical power, which may be received from a power source that is separate from the HVAC system. For example, the power source may be an electrical grid source, such as a utility grid, or an electrical power generator to which the HVAC system is electrically coupled. The electrical power, which may include an input voltage, received from the power source may be used to power certain components of the HVAC system, such as a controller, in order to regulate operation of the HVAC system. The electrical power may also power other components of the HVAC system, such as a compressor and/or a fan. During typical operation, the HVAC system may operate in a normal operating mode to condition an air flow. As used herein, the normal operating mode refers to operation of the HVAC system when the input voltage received from the power source is substantially equal to an expected input voltage value, such as 20 volts (V), 24 V, 30 V, or any other suitable voltage value. For example, during the normal operating mode, the input voltage may be suitable to operate components of the HVAC system at any desired operating parameter value of a full or possible range of operating parameter values.

However, in some circumstances, the input voltage provided by the power source may be different than the expected input voltage. As an example, the input voltage may be substantially lower than the expected input voltage, such as during a brownout event in which an electrical grid provides a reduced voltage to the HVAC system. As another example, the input voltage may be substantially greater than the expected input voltage, such as during a change in operation of the electrical grid. In any case, the change in input voltage may not be caused by operation of components of the HVAC system, but may still affect the operation of the HVAC system. For instance, the input voltage may cause the HVAC system to operate inefficiently. As an example, the input voltage may be insufficient to enable operation of a component of the HVAC system at a target operating parameter value. In certain embodiments, the deviated input voltage may cause the operation of the HVAC system to be suspended or shut down. As a result, the HVAC system may not condition the air flow when receiving deviated or unexpected input voltages.

Thus, it is presently recognized that enabling the HVAC system to use the deviated input voltage to condition the air flow effectively may improve the operation of the HVAC system. Accordingly, embodiments of the present disclosure are directed to identifying a voltage variation event in which the input voltage deviates or substantially deviates from the expected input voltage and to adjusting the operation of the HVAC system in response to identifying the voltage variation event. For example, the input voltage received from the power source may be monitored and compared to an expected input voltage value. Based on the comparison, a voltage variation event may be identified. In response to identifying the voltage variation event, the HVAC system may operate in a de-rated operating mode rather than in the normal operating mode. In the de-rated operating mode, a currently active operating mode may be adjusted to account for the deviated input voltage received during the voltage variation event. As a result, the HVAC system may continue to provide effective conditioning capabilities while receiving deviated input voltages.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
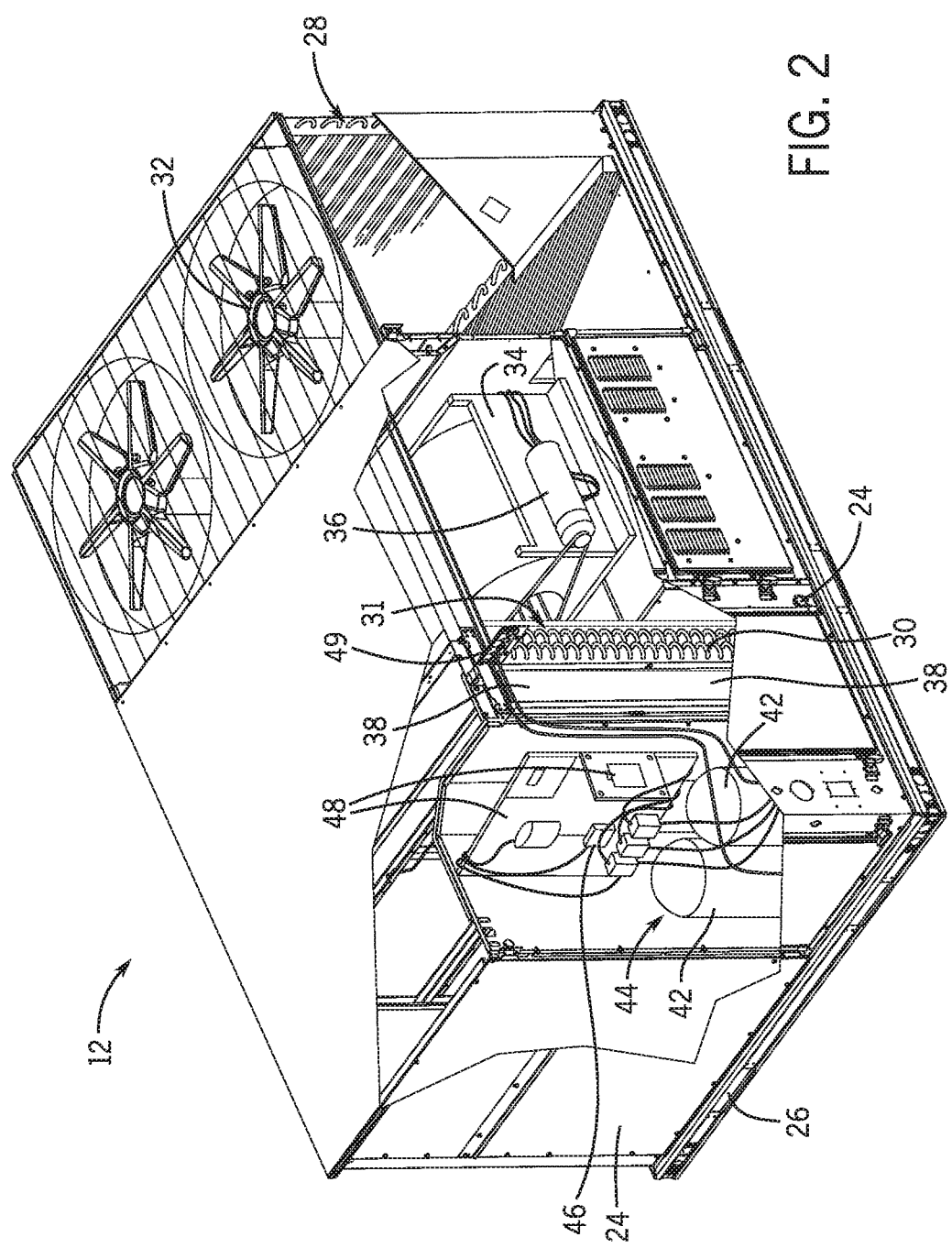
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
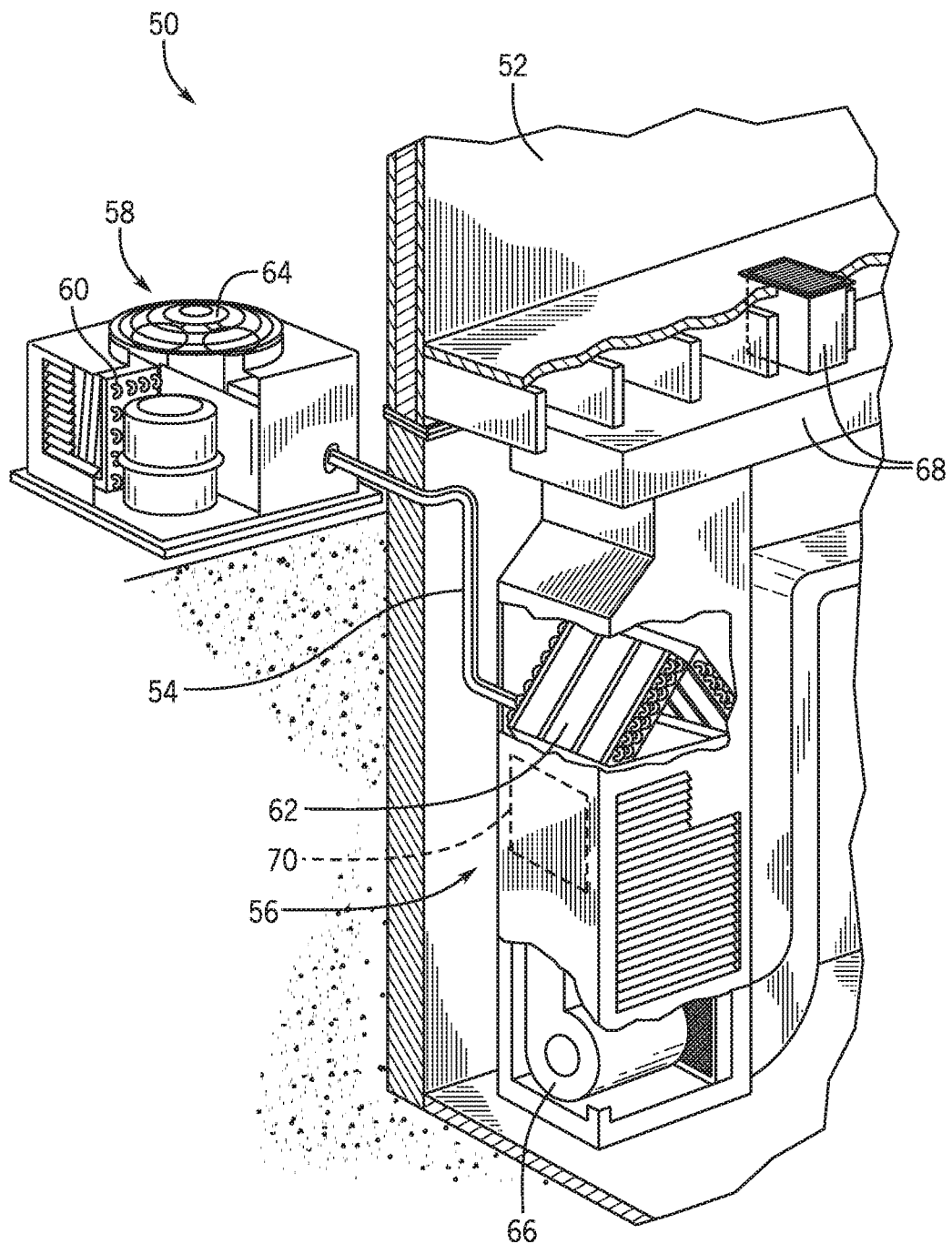
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
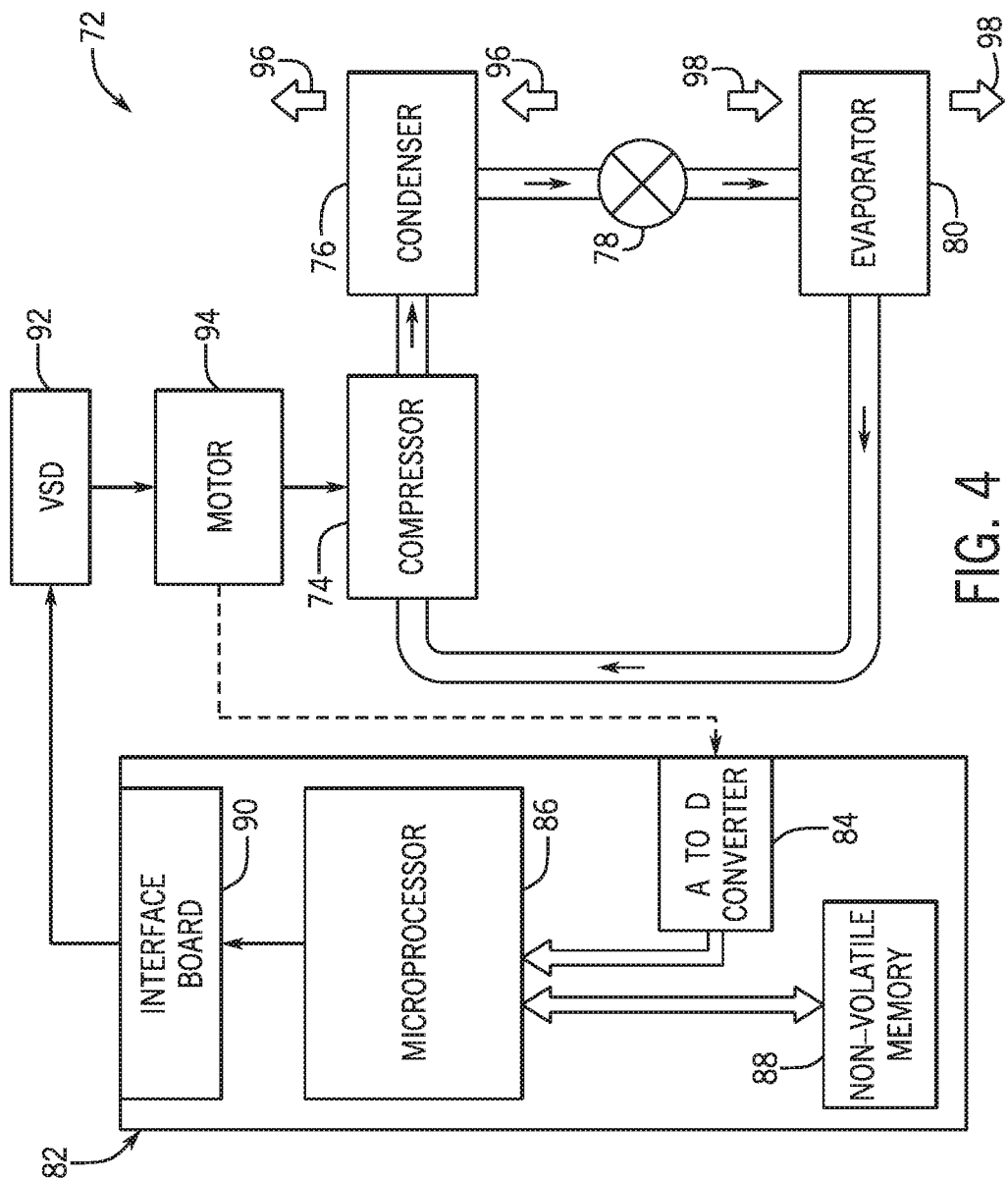
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to systems and methods configured to identify a voltage variation event and to operate the HVAC system in response to identifying the voltage variation event. In some embodiments, input voltages received from a power source as power supply may be compared with an expected input voltage or value to identify the voltage variation event. The voltage variation event may indicate that the input voltages received by the HVAC system are deviated input voltages. For example, the voltage variation event may be identified in response to a determination that the input voltage is greater than an upper threshold voltage or value or is less than a lower threshold voltage or value. In addition, the HVAC system may transition from a normal operating mode to a de-rated operating mode based on identification of the voltage variation event. In the de-rated operating mode, operation of a component of the HVAC system may be adjusted. By way of example, a compressor may operate in a limited range of operating parameters or operating parameter values or based on a particular operating parameter or value. In any case, the HVAC system may operate in a manner that utilizes the deviated input voltage to continue to operate to condition the air flow.

Figure 5:
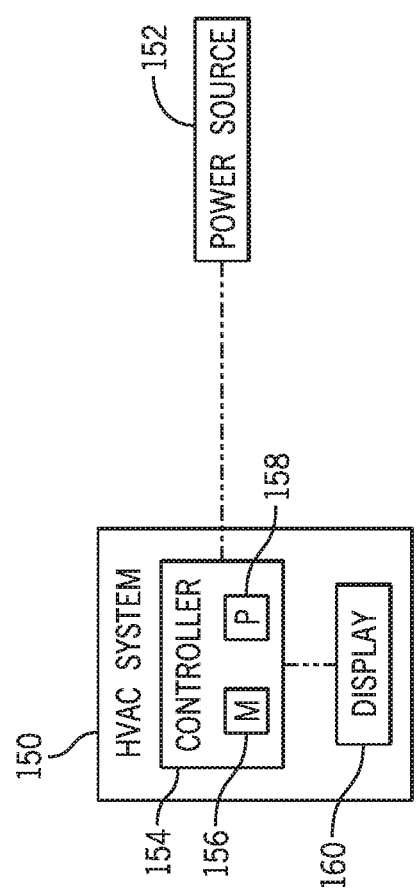
FIG. 5 is a schematic of an embodiment of an HVAC system configured to receive power from a power source, in accordance with an aspect of the present disclosure.

With the preceding in mind, FIG. 5 is a schematic diagram of an embodiment of an HVAC system 150, which may be any suitable HVAC system, such as packaged unit (e.g., the HVAC unit 12), a split system (e.g., the residential heating and cooling system 50), a heat pump configured to operate in either a heating mode or a cooling mode, or any other type of HVAC system. The HVAC system 150 may be electrically coupled to a power source 152, which may be an electrical power source that provides the HVAC system 150 with electrical power in order to operate components of the HVAC system 150. For example, the HVAC system 150 may include a controller 154 configured to receive electrical power from the power source 152 to operate various components of the HVAC system 150 (e.g., the compressor 74 of the vapor compression system 72). The controller 154 may include a memory 156 and processing circuitry 158, such as a microprocessor. The memory 156 may include volatile memory, such as random-access memory (RAM), and/or non-volatile memory, such as read-only memory (ROM), optical drives, hard disc drives, solid-state drives, or any other non-transitory computer-readable medium that includes instructions to operate the HVAC system 150. The processing circuitry 158 may be configured to execute instructions stored on the memory 156 to control operation of various components of the HVAC system 150. For example, the processing circuitry 158 may include one or more application specific integrated circuits (ASICs), one or more field programmable gate arrays (FPGAs), one or more general purpose processors, or any combination thereof, to operate the HVAC system 150.

As discussed above, the HVAC system 150 may operate in the normal operating mode while the power source 152 provides an expected amount of electrical power, such as an expected input voltage. In certain embodiments, the HVAC system 150 may also include a display 160, which may be used to display a current operating mode (e.g., to a user, operator, or technician). Thus, while the HVAC system 150 operates in the normal operating mode, the display 160 may present information indicative of the normal operating mode. However, in some circumstances, the power source 152 may not provide an expected amount of electrical power to enable the HVAC system 150 to operate in the normal operating mode. For example, the power source 152 may provide an input voltage that deviates or significantly deviates from the expected input voltage. However, in accordance with present techniques, the HVAC system 150 may still utilize the input voltage to operate and provide some conditioning functionality. As an example, the HVAC system 150 may be configured to operate in a de-rated operating mode, and the controller 154 may cause the display 160 to output information and/or a notification indicative of the de-rated operating mode. In additional or alternative embodiments, the information and/or notification may be presented in a different manner. For instance, the controller 154 may output a notification to a mobile device, present a different visual output (e.g., flash a light), present an audio output, output the information and/or notification in any other suitable manner, or any combination thereof. In any case, the notification and/or information may notify the user that the HVAC system 150 is operating in the de-rated operating mode.

With this in mind, FIGS. 5-9 each illustrate an embodiment of a method or process for operating the HVAC system 150. In particular, each method depicted via FIGS. 5-9 may be performed based on the electrical power, such as a measured value of the electrical power, received by the HVAC system 150 via the power source 152. In certain embodiments, a single controller, such as the controller 154, may be configured to execute some or all illustrated steps of one of the methods. In additional or alternative embodiments, one controller may execute a portion of the steps of one of the methods, and one or more additional controllers may execute another portion of the steps. Furthermore, it should be noted that the steps of each method may be performed differently, such as for different embodiments of the HVAC system 150. By way of example, additional steps may be performed with respect to the steps depicted in FIGS. 5-9. Additionally or alternatively, certain steps described in FIGS. 5-9 may be removed, modified, and/or performed in a different order. Moreover, it should be noted that each of the methods presented in FIGS. 5-9 may be performed at the same time as one another or at different times, such as in a sequential manner. Indeed, the steps for one of the methods may be performed in any suitable manner relative to a step for another method.

Figure 6:
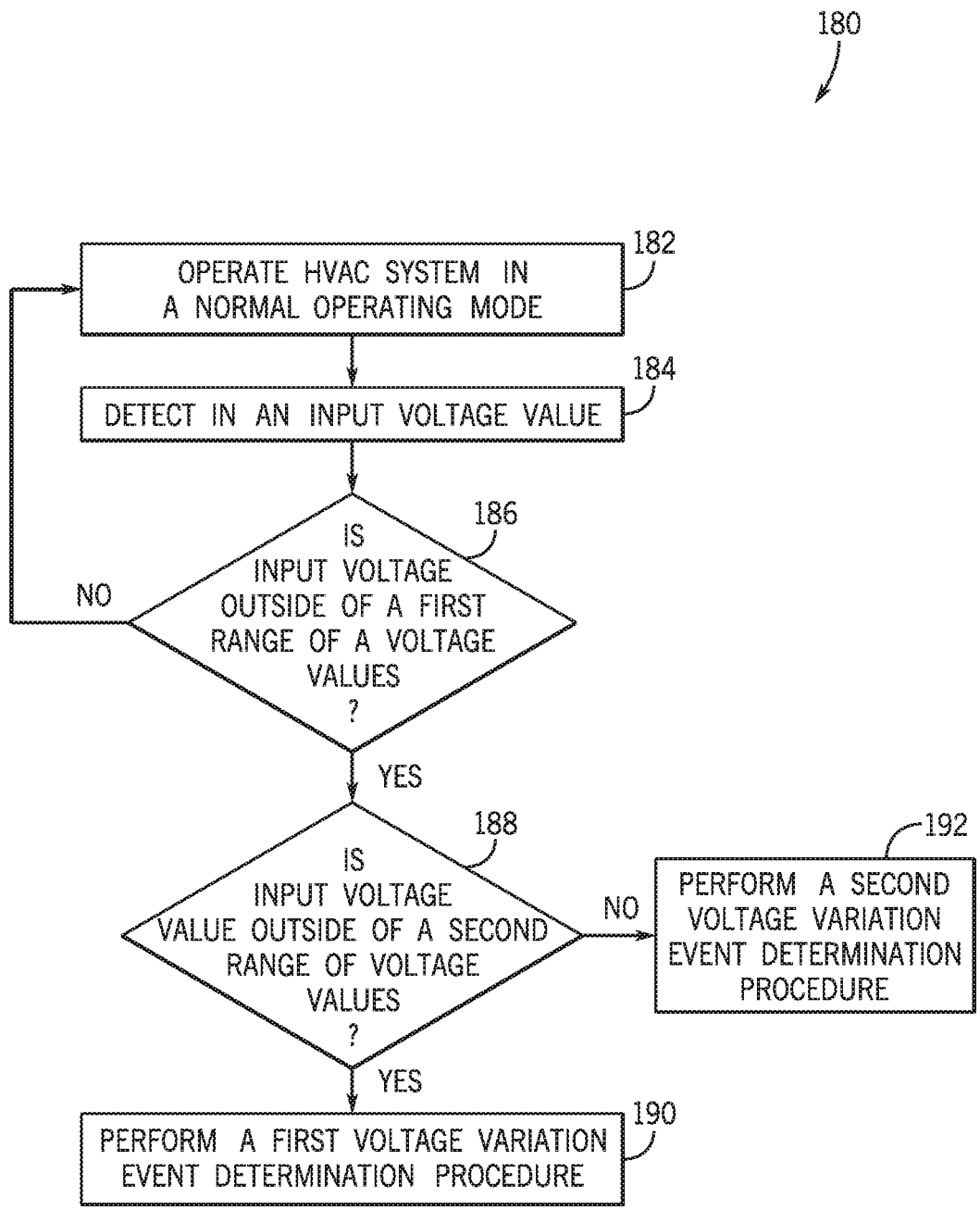
FIG. 6 is a flowchart of an embodiment of a method or process for identifying a voltage variation event, in accordance with an aspect of the present disclosure.

FIG. 6 is a flowchart of an embodiment of a method or process 180 for determining an identification procedure used to detect a voltage variation event. In particular, the specific manner in which the voltage variation event is identified may be based on the input voltage value received from the power source 152. At block 182, the HVAC system 150 is operated in the normal operating mode. For example, the operation of each component of the HVAC system 150 may be set to a desirable or target operating parameter value to condition an air flow. While the HVAC system 150 is operated in the normal operating mode, an input voltage may be received by the HVAC system 150 from the power source 152 to be used for operating the HVAC system 150 in the desired manner. The input voltage may be detected to determine a value of the input voltage, as indicated at block 184.

The input voltage may also be compared with a first range of voltage values to determine whether the input voltage is outside of the first range of voltage values, as shown at block 186. For instance, a determination may be made as to whether the input voltage exceeds a first upper threshold voltage value, which may be greater than the expected input voltage by a difference value and/or whether the input voltage is less than a first lower threshold voltage value, which may be less than the expected input voltage by another difference value. In some embodiments, the particular first range of voltage values may be dependent on the particular operating mode of the HVAC system 150 utilized at a time that the input voltage value is detected. For example, for a cooling mode of the HVAC system 150, the first upper threshold voltage value may be 8 percent, 10 percent, 12 percent, or another suitable percentage value greater than the expected input voltage, and the first lower threshold voltage value may be 8 percent, 10 percent, 12 percent, or another suitable percentage value less than the expected input voltage. Moreover, for a heating mode of the HVAC system 150, the first upper threshold voltage value may be 10 percent, 12 percent, 15 percent, 18 percent, or another suitable percentage value greater than the expected input voltage, and the first lower threshold voltage value may be 10 percent, 12 percent, 15 percent, 18 percent, or another suitable percentage value less than the expected input voltage. In certain embodiments, the first range of voltage values may be the same regardless of the operating mode of the HVAC system 150. It should also be noted that in certain embodiments, the first upper threshold voltage value and the first lower threshold voltage value may each differ from the expected input voltage by the same difference value (e.g., the same percentage). In other words, the expected input voltage is approximately in the middle of the first range of voltage values. In additional or alternative embodiments, the first upper threshold voltage value may differ from the expected input voltage by a different percentage or amount than that of the first lower threshold voltage value such that the expected input voltage is offset from the middle of the first range of voltage values.

If a determination is made that the input voltage is not outside of the first range of voltage values, the HVAC system 150 may continue to be operated in the normal operating mode, and input voltages from the power source 152 may continue to be detected and compared to the first range of voltage values. However, if a determination is made that the input voltage is outside of the first range of voltage values, another determination may be made regarding whether the input voltage is outside of a second range of voltage values, as indicated at block 188. The second range of voltage values may include a second upper threshold voltage value and a second lower threshold voltage value, each of which may differ from the expected input voltage by a greater difference value than that of the first upper threshold voltage value and of the second upper threshold voltage value, respectively. In other words, the difference between the second upper/lower threshold voltage values and the expected input voltage may be greater than the difference between the first upper/lower threshold voltage values and the expected input voltage. As an example, the second upper threshold voltage value may be 20 percent, 22 percent, 25 percent, or another suitable value greater than the expected input voltage, and the second lower threshold voltage value may be 20 percent, 22 percent, 25 percent, or another suitable value less than the expected input voltage.

If a determination is made that the input voltage is outside of the second range of voltage values, a first voltage variation event determination procedure may be performed, as indicated at block 190. That is, if the input voltage is determined to be greater than the second upper threshold voltage value or less than the second lower threshold voltage value, the first voltage variation event determination procedure may be performed. However, if the input voltage is determined to be outside of the first range of voltage values but not outside of the second range of voltage values, a second voltage variation event determination procedure may be performed instead, as shown at block 192.

Figure 7:
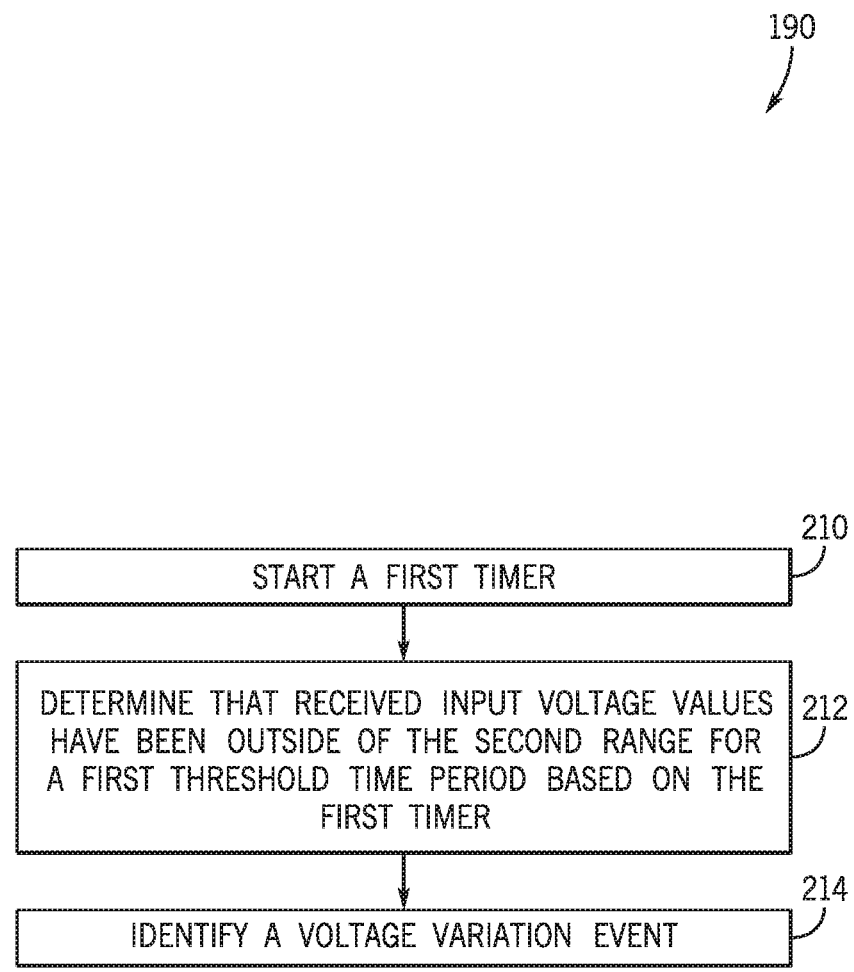
FIG. 7 is a flowchart of an embodiment of a method or process for identifying a voltage variation event, in accordance with an aspect of the present disclosure.

FIG. 7 is a flowchart of an embodiment of the method or process 190 for performing the first voltage variation event determination procedure, such as after the steps described with reference to the method 180 of FIG. 6 have been performed. For instance, after a determination is made that a received input voltage is outside of the second range of voltage values, the method 190 may be executed. During performance of the method 190, input voltages may be continuously received via the power source 152 and detected accordingly. The input voltages may also be continuously compared with the expected input voltage, the first range of voltage values, the second range of voltage values, or any combination thereof, such as at a frequency of every second, every five seconds, every ten seconds, or at any other suitable frequency or time interval. At block 210, a first timer is started to monitor a first time duration in which received input voltages are outside of the second range of voltage values. In some embodiments, the first time duration may indicate a consecutive amount of time in which the received input voltages have been outside of the second range of voltage values. If a determination is made that a received input voltage is within the second range of voltage values, the first timer may be reset. For example, the method 190 may restart to re-initialize the first timer, or the method 180 may be performed such that the HVAC system 150 is operated in the normal operating mode (e.g., block 182 of FIG. 6) upon a determination that the received input voltage is within the second range of voltage values. In additional or alternative embodiments, the first time duration may indicate a total amount of time (e.g., within a time interval) in which the received input voltages have been outside of the second range of voltage values. That is, if a determination is made that the received input voltage is within the second range of voltage values, the first timer may be paused at a halted time but may not be reset. Then, if a determination is made that a subsequently received input voltage is outside of the second range of voltage values, the first time duration may continue to be monitored and accumulated from the previously indicated halted time by the first timer.

At block 212, based on the first timer, a determination may be made that the received input voltages have been outside of the second range of voltage values for a first threshold time period. For example, the first threshold time period may be 30 seconds, 45 seconds, 1 minute, 3 minutes, or any other suitable time period. In response to a determination that the received input voltages have been outside of the second range of voltage values for the first threshold time period, a voltage variation event may be identified, as indicated at block 214. Accordingly, the voltage variation event is identified via the first voltage variation event determination procedure when a determination is made that received input voltages have been outside of the second range for a time period that is greater than the first threshold time period.

Figure 8:
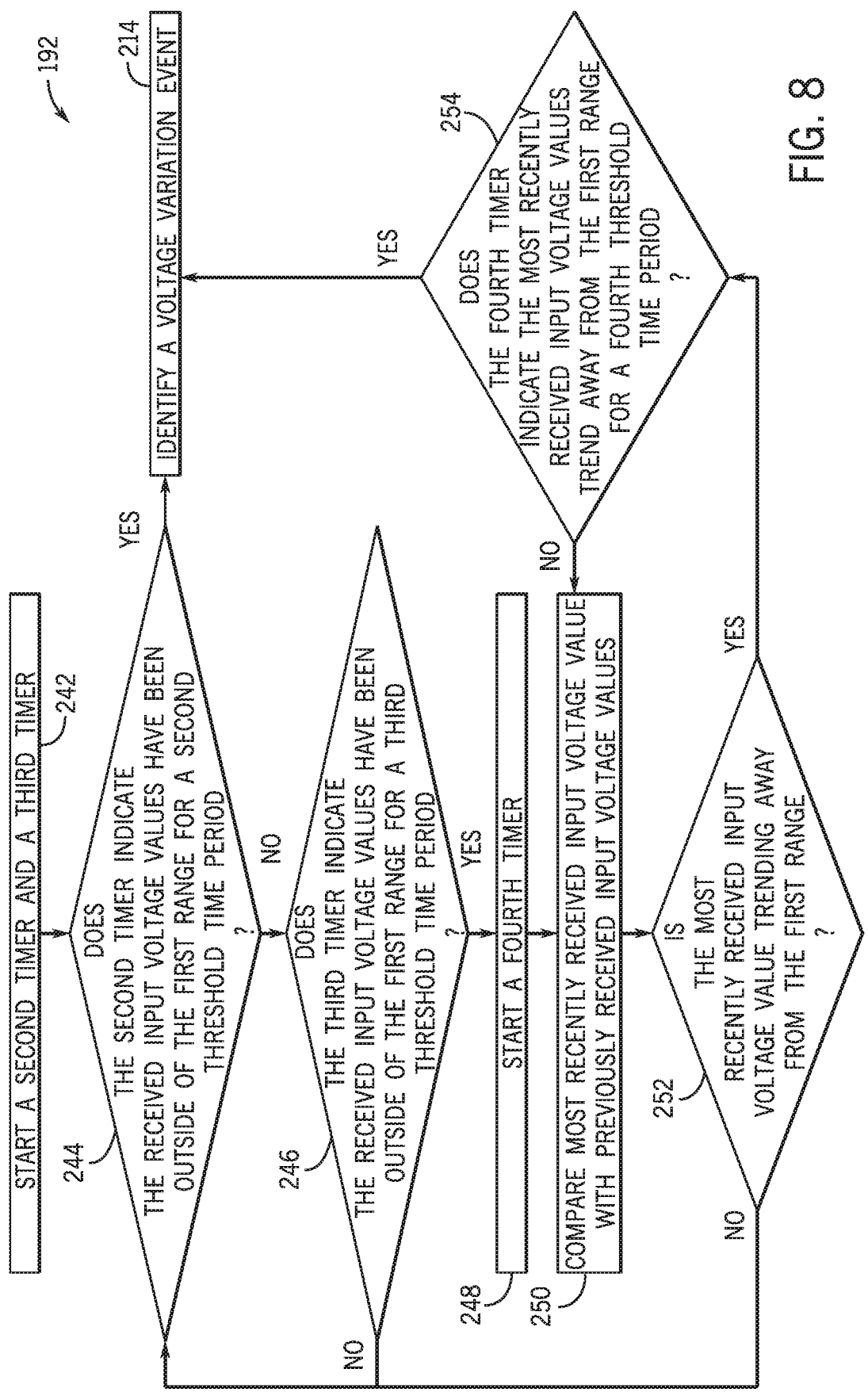
FIG. 8 is a flowchart of an embodiment of a method or process for identifying a voltage variation event, in accordance with an aspect of the present disclosure.

FIG. 8 is a flowchart of an embodiment of the method or process 192 for performing the second voltage variation event determination procedure, such as after the steps described with reference to the method 180 of FIG. 6 have been performed. For instance, after a determination is made that a received input voltage is outside of the first range of voltage values but within the second range of voltage values, the method 192 may be executed. During performance of the method 192, input voltages may be continuously received via the power source 152. Such input voltages may also be continuously compared with the expected input voltage, the first range of voltage values, the second range of voltage values, or any combination thereof. At block 242, a second timer and a third timer are each started to monitor a second time duration and a third time duration, respectively. Thus, the second time duration and the third time duration may be separately tracked during the method 192.

At block 244, a determination is made regarding whether the second timer has indicated the received input voltages have been outside of the first range of voltage values for a second threshold time period. The second threshold time period may be greater or substantially greater than the first threshold time period, such as 100 seconds, 2 minutes, 6 minutes, 10 minutes, or any other suitable time period. If the second timer indicates that the received input voltages have been outside of the first range of voltage values for the second threshold time period, the voltage variation event may be identified at block 214. For example, if the second timer indicates that the input voltages received from the power source 152 have stabilized at a voltage value that is outside of the first range of voltage values, the power source 152 may not be operating or providing electrical power as expected (e.g., during a brownout event). In some embodiments, the second threshold time period may be a consecutive time period in which the received input voltages have been outside of the first range of voltage values. Thus, the second timer may be reset when a determination is made that the received input voltages are within the first range of voltage values. In additional or alternative embodiments, the second threshold time period may be a total amount of time (e.g., within a certain time interval) in which the received input voltages have been outside of the first range of voltage values.

In further embodiments, the second timer may additionally or alternatively be reset and/or paused in response to a determination that the received input voltages are trending toward the expected input voltage at a particular rate, such as at 0.1 V every 30 seconds, 0.5 V every 30 seconds, 0.1 V every 1 minute, 0.2 V every 10 seconds, or at any suitable rate. Accordingly, the voltage variation event may not be identified when a determination is made that the received input voltages are trending toward the first range of voltage values to enable the HVAC system 150 to operate in the normal operating mode. For example, maintenance may have been performed on the power source 152 to enable the power source 152 to begin providing voltages near the expected input voltage. Accordingly, the second timer may be reset to avoid premature identification of the voltage variation event.

However, if a determination is made that the received input voltages have not been outside of the first range of voltage values for the second threshold period based on the second timer, a further determination may be made regarding whether the received input voltages have been outside of the first range of voltage values for a third threshold time period based on the third timer, as shown at block 246. As an example, the third threshold time period may be 30 seconds, 45 seconds, 1 minute, or any other suitable threshold time period less or substantially less than the second threshold time period. If the third timer indicates that the received input voltages have not yet been outside of the first range of voltage values for the third threshold time period, the third timer may be continuously monitored. However, if a determination is made that the received input voltages are within the first range of voltage values at any point, the third timer may be reset.

If the third timer indicates that the received input voltages have been outside of the first range of voltage values for the third threshold time period, a fourth timer (e.g., a trend timer) may be started, as indicated at block 248. The fourth timer may be used for monitoring a duration of a trend of the received input voltages. For example, in order to determine the trend of the received input voltages, a most recently received input voltage may be compared with one or more previously received input voltages, as shown at block 250. In some embodiments, the most recently received input voltage may be compared with the most previously received input voltage. In additional or alternative embodiments, the most recently received input voltage may be compared with an average voltage value of input voltages received in a previous time window, such as of input voltages received in the previous 20 seconds, in the previous 30 seconds, in the previous 1 minute, or in any suitable time interval. In any case, as subsequent input voltages are continuously received, the subsequent input voltages may be compared with a different (e.g., updated) set of previously received input voltages.

At block 252, a determination is made regarding whether the most recently received input voltage is trending away from the first range of voltage values based on the comparison between the most recently received input voltage with the one or more previously received input voltages. If a determination is made that the most recently received input voltage is not trending away from the first range of voltage values, the fourth timer may be reset and/or paused, and the second timer and the third timer may be continuously monitored. However, if a determination is made that the most recently received input voltage is trending away from the first range of voltage values, a further determination may be made as to whether the fourth timer indicates the most recently received input voltages have been trending away from the first range of voltage values for a fourth threshold time period (e.g., a trend time duration), as indicated at block 254. By way of example, the fourth threshold time period may be 20 seconds, 30 seconds, 40 seconds, 50 seconds, 1 minute, or any suitable time period. If the fourth timer does not indicate that the most recently received input voltages have been trending away from the first range of voltage values for the fourth threshold time period, thereby indicating that there currently is not a variation trend, no further action may be performed, and subsequent input voltages may be compared with previously received input voltages.

However, if the fourth timer does indicate that the most recently received input voltages have been trending away from the first range of voltage values for the fourth threshold time period, thereby indicating an occurrence of a variation trend, the voltage variation event may be identified at block 214. Accordingly, the voltage variation event may be identified in response to a determination that voltage trend of the received input voltages is the variation trend, which may indicate that the input voltages are fluctuating away from the expected input voltage. In this manner, the method 192 may anticipate that the power source 152 is not operating or providing electrical power as expected before the input voltages received from the power source 152 have stabilized outside of the first range of voltage values. In certain embodiments, the fourth threshold time period may be based on a rate in which the most recently received input voltages trend away from the first range of voltage values. As an example, if a determination is made that the input voltages trend away from the first range of voltage values at a high or faster rate, the fourth threshold time period may be shorter such that the voltage variation event is identified more quickly. As another example, if a determination is made that the input voltages trend away from the first range of voltage values at a low or slower rate, the fourth threshold time period may be longer such that the voltage variation event is identified more slowly. In this way, the fourth threshold time period may be dynamically adjusted based on a determined rate at which the received input voltages trend away from the first range of voltage values.

It should be noted that each of the methods 180, 190, 192 may be performed after operation of the HVAC system 150 has stabilized. In this manner, the methods 180, 190, 192 may avoid identifying the voltage variation event based on a fluctuating operation of the HVAC system 150 (e.g., during a start-up or initialization of an operating mode of the HVAC system 150) instead of based on unexpected operation of the power source 152. To this end, the methods 180, 190, 192 may be performed at some time interval after a change in operation of the HVAC system 150 has initialized. For example, the method 180, 190, 192 may be performed 1 minute, 2 minutes, 5 minutes, or any suitable time after initiating a heating mode, initiating a cooling mode, suspending or terminating a defrost mode, or changing any other suitable operating mode of the HVAC system 150.

Figure 9:
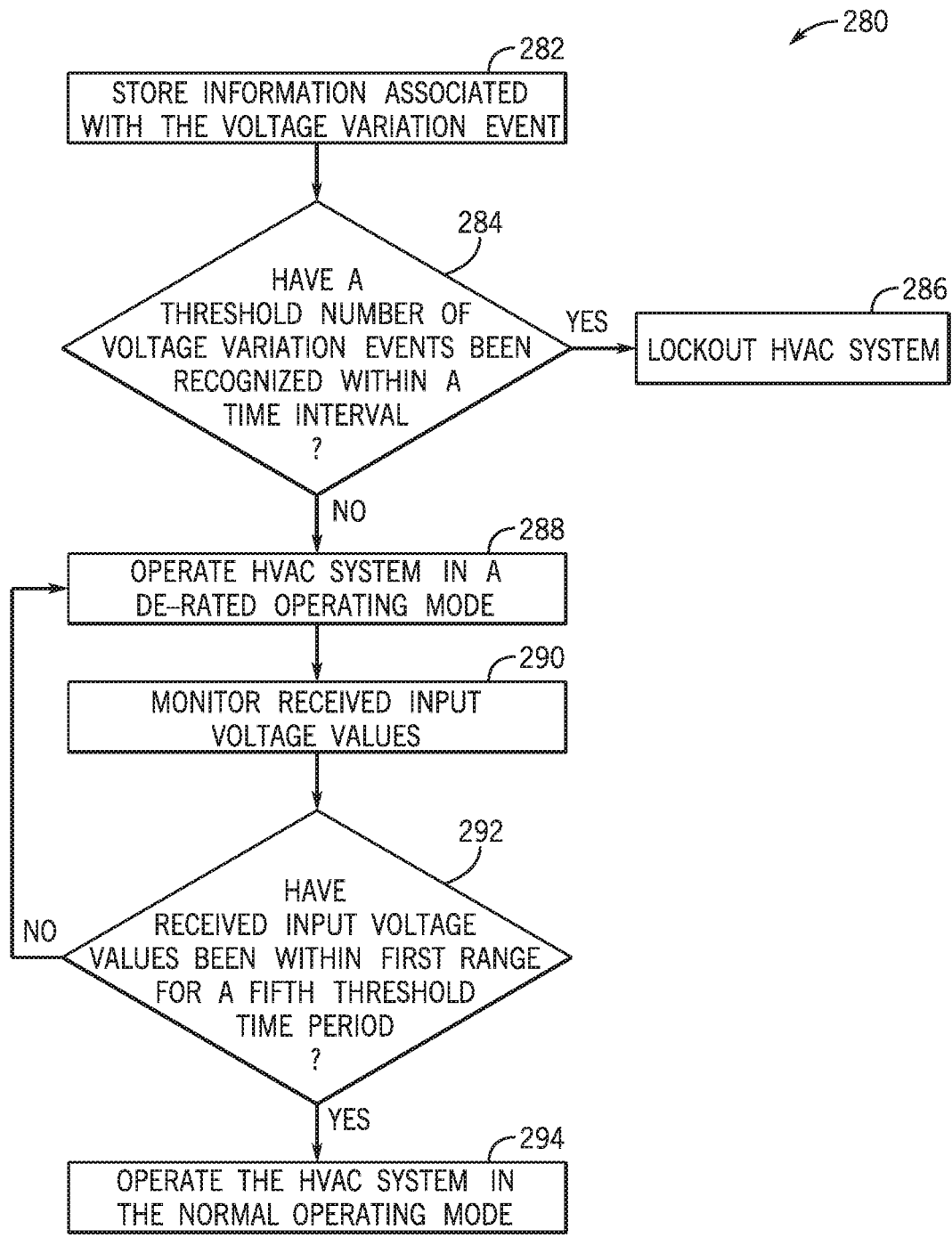
FIG. 9 is a flowchart of an embodiment of a method or process for operating an HVAC system based on identification of a voltage variation event, in accordance with an aspect of the present disclosure.

FIG. 9 is a flowchart of an embodiment of a method or process 280 for operating the HVAC system 150 in response to identifying a voltage variation event. At block 282, information associated with the voltage variation event is stored. Such information may include a certain quantity of received input voltages prior to identification of the voltage variation event, the time (e.g., date, time of day) of the identification of the voltage variation event, an operational status of certain equipment (e.g., an operating mode, an operating parameter value) of the HVAC system 150, any other suitable information, or any combination thereof. The information may be retrieved at a later time, such as during maintenance of the HVAC system 150. For example, information regarding the voltage variation event may notify an operator or technician of the HVAC system 150 that the de-rated operating mode of the HVAC system 150 was caused by unexpected or deviated input voltages received from the power source 152, rather than by a deviated operation of a component of the HVAC system 150. Additionally or alternatively, the display 160 may present the information to indicate that the HVAC system 150 is operating in the de-rated operating mode. In any case, the information may indicate that the de-rated operating mode of the HVAC system was caused by the power source 152, rather than by a component of the HVAC system 150. Therefore, for example, the user may avoid performing unnecessary maintenance on the HVAC system 150.

At block 284, a determination may be made regarding whether a quantity of instances of voltage variation events have been identified within a time interval. For example, a determination may be made regarding whether the quantity of instances exceeds 2, 3, 5, or any other suitable threshold number of voltage variation events identified within a 2 hour time period, a 4 hour time period, a 5 hour time period, a 10 hour time period, or any other suitable time period. At block 286, in response to a determination that the quantity of instances exceeds the threshold number, the HVAC system 150 may be locked out or operated in a lockout mode. In the lockout mode, operation of the HVAC system 150 may be suspended or terminated such that the HVAC system 150 does not condition an air flow. In some embodiments, the lockout mode may be a soft lockout mode, and the HVAC system 150 may automatically re-initialize a conditioning operation (e.g., the normal operating mode) after a time interval (e.g., 30 minutes, 1 hour, 2 hours) has passed. In additional or alternative embodiments, the lockout mode may be a hard lockout mode, and operation of the HVAC system 150 may not re-initialize until after a user, such as an operator or technician, performs maintenance (e.g., executes a test operation, enters a code) on the HVAC system 150.

At block 288, if a determination is made that the quantity of instances does not exceed the threshold number, the HVAC system 150 may be operated in a de-rated operation. In certain embodiments, the de-rated operation of the HVAC system 150 may be based on a component of the HVAC system 150, such as based on a specification of the compressor 74 when the HVAC system 150 is in an active operation (e.g., to condition an air flow, to defrost a heat exchanger). In an example, if the compressor 74 is a variable capacity compressor and the HVAC system 150 is in active operation, the compressor 74 may be operated at a de-rated nominal capacity, which may be determined during development, manufacture, or testing of the compressor 74 and/or of the HVAC system 150. In another example, if the compressor 74 is a single stage compressor and the HVAC system 150 is in active operation, the operation of the HVAC system 150 may be suspended or shut down, and an anti-short cycle delay period, which may be determined during development, manufacture, or testing of the compressor 74 and/or of the HVAC system 150, may elapse before operation of the HVAC system 150 restarts. In a further example, if the compressor 74 is a multi-stage (e.g., 2-stage) compressor, the compressor 74 may transition to a first stage, a reduced stage, or another predetermined stage, or operation of the HVAC system 150 may be may be suspended or shut down (e.g., if the compressor 74 is currently operating in the first stage), and the anti-short cycle delay period may elapse before operation of the HVAC system 150 restarts. Moreover, if the HVAC system 150 is not currently operating when the voltage variation event is identified, operation of the compressor 74 may continue to be suspended regardless of the specification of the compressor 74.

At block 290, the input voltages received from the power source 152 are continuously monitored and detected while the HVAC system 150 operates in the de-rated operation in order to determine the value of the input voltages. At block 292, a determination is made regarding whether the received input voltages have been within the first range of voltage values for a fifth threshold time period, such as based on a fifth timer. For instance, the fifth threshold time period may be 100 seconds, 200 seconds, 300 seconds, 500 seconds, or any other suitable time period. If a determination is made that the received input voltages have not been within the first range of voltage values for the fifth threshold time period, the HVAC system 150 may continue to operate in the de-rated operation, and the input voltages received from the power source 152 may be continuously monitored.

However, if a determination is made that the received input voltages have been within the first range of voltage values for the fifth threshold time period, the HVAC system 150 may be operated in the normal operating mode, as indicated at block 294. That is, such a determination may indicate that the input voltages received from the power source 152 may no longer be fluctuating to cause an identification of another voltage variation event. In other words, the input voltages may have stabilized within the first range of voltage values.

The present disclosure may provide one or more technical effects useful in the operation of an HVAC system. For example, the HVAC system may receive input voltages from a power source in order to operate and condition an air flow. When the input voltages are substantially equal to an expected input voltage, the HVAC system may operate in a normal operating mode. However, when the input voltages differ or substantially differ from the expected input voltage, thereby indicating a voltage variation event, the HVAC system may operate in a de-rated operating mode. In certain embodiments, the voltage variation event may be identified based on a comparison between the input voltages received from the power source and an expected input voltage value or a range of voltage values. In the de-rated operating mode, a component, such as a compressor, of the HVAC system may operate in a particular operation. The particular operation may be based on a predetermined (e.g., reduced) operating parameter that enables the component to effectively utilize the input voltage to condition the air flow. As a result, the HVAC system may continue to condition the air flow during the voltage variation event. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A controller for a heating, ventilation, and/or air conditioning (HVAC) system, wherein the controller is configured to:
   detect an input voltage received as a power supply by the HVAC system;
   determine the input voltage exceeds a threshold value;
   in response to determining that the input voltage exceeds the threshold value:
      identify a voltage variation event in response to a determination that a duration of time during which the input voltage exceeds the threshold value is greater than a first threshold time period; and
      identify the voltage variation event in response to a determination that the input voltage trends away from the threshold value for a second threshold time period, wherein the second threshold time period is less than the first threshold time period; and
   operate a vapor compression system of the HVAC system in a de-rated operating mode to condition an air flow in response to identifying the voltage variation event.

2. The controller of claim 1, wherein the controller is configured to:
   initiate a timer upon determining the input voltage exceeds the threshold value;
   monitor the duration of time based on the timer; and
   reset the timer in response to determining that the input voltage is below the threshold value.

3. The controller of claim 1, wherein the controller is configured to:
   initiate a timer upon determining the input voltage exceeds the threshold value;
   monitor the duration of time based on the timer; and
   reset the timer in response to determining that the input voltage adjusts toward the threshold value.

4. The controller of claim 1, wherein the controller is configured to:
   monitor a total duration of time during which the input voltage exceeds the threshold value; and
   identify the voltage variation event based on determining the total duration of time exceeds an additional threshold time period, wherein the additional threshold time period is greater than the first threshold time period.

5. The controller of claim 1, wherein the controller is configured to compare the input voltage with a previously received input voltage to determine whether the input voltage trends away from the threshold value.

6. The controller of claim 1, wherein the threshold value is a first threshold value that is lower than a second threshold value, and the controller is configured to:
   monitor an additional duration of time during which the input voltage exceeds the second threshold value and does not adjust toward the second threshold value; and
   identify the voltage variation event based on determining that the additional duration of time exceeds an additional threshold time period.

7. The controller of claim 1, wherein the controller is configured to present a notification indicative of the voltage variation event in response to identifying the voltage variation event.

8. The controller of claim 7, wherein the controller is configured to present the notification on a display of the HVAC system.

9. The controller of claim 1, wherein the controller is configured to identify the voltage variation event in response to a determination that:
   a first additional input voltage received subsequent to receipt of the input voltage trends away from the threshold value during the second threshold time period; and
   a second additional input voltage received subsequent to receipt of the first additional input voltage trends away from the threshold value during the second threshold time period.

10. The controller of claim 1, wherein the controller is configured to determine that the input voltage trends away from the threshold value by comparing one or more additional input voltages to a previously received input voltage during the second threshold time period.

11. A non-transitory, computer-readable medium comprising computer-executable instructions that, when executed by processing circuitry, cause the processing circuitry to:
   detect an input voltage received by a heating, ventilation, and/or air conditioning (HVAC) system;
   compare the input voltage to a first range of voltage values and a second range of voltage values, wherein the second range of voltage values is contained within the first range of voltage values;
   determine the input voltage is outside of the first range of voltage values and the second range of voltage values;
   monitor a first duration of time during which the input voltage remains outside of the first range of voltage values and the second range of voltage values;
   identify a voltage variation event based on determining that the first duration of time exceeds a first threshold time period;
   determine the input voltage is outside of the second range of voltage values and within the first range of voltage values;

monitor a second duration of time during which the input voltage remains outside of the second range of voltage values and within the first range of voltage values;

identify the voltage variation event based on determining that the second duration of time exceeds a second threshold time period, wherein the second threshold time period is greater than the first threshold time period; and operate a vapor compression system of the HVAC system in a de-rated operating mode to condition an air flow in response to identifying the voltage variation event.

12. The non-transitory, computer-readable medium of claim 11, wherein the first range of voltage values comprises a first upper threshold voltage value and a first lower threshold voltage value, and the computer-executable instructions, when executed by the processing circuitry, cause the processing circuitry to:

monitor the first duration of time based on the input voltage being greater than the first upper threshold voltage value or less than the first lower threshold voltage value.

13. The non-transitory, computer-readable medium of claim 12, wherein each of the first upper threshold voltage value and the first lower threshold voltage value deviates from an expected input voltage value by a first difference value.

14. The non-transitory, computer-readable medium of claim 13, wherein the second range of voltage values comprises a second upper threshold voltage value and a second lower threshold voltage value, and each of the second upper threshold voltage value and the second lower threshold voltage value deviates from the expected input voltage value by a second difference value that is less than the first difference value.

15. The non-transitory, computer-readable medium of claim 11, wherein the computer-executable instructions, when executed by the processing circuitry, cause the processing circuitry to:

determine a quantity of instances in which the voltage variation event has been identified over a time interval; and operate the HVAC system in a lockout mode in response to determining the quantity of instances exceeds a threshold quantity of identified voltage variation events.

16. The non-transitory, computer-readable medium of claim 15, wherein the computer-executable instructions, when executed by the processing circuitry, cause the processing circuitry to operate the vapor compression system of the HVAC system in the de-rated operating mode in response to determining the quantity of instances does not exceed the threshold quantity of identified voltage variation events.

17. The non-transitory, computer-readable medium of claim 11, wherein the computer-executable instructions, when executed by the processing circuitry, cause the processing circuitry to:

monitor a subsequent input voltage received during operation in the de-rated operating mode;

determine the subsequent input voltage is within the second range of voltage values;

monitor a third duration of time during which the subsequent input voltage remains within the second range of voltage values; and transition the vapor compression system of the HVAC system from operating in the de-rated operating mode to operating in a normal operating mode in response to determining that the third duration of time exceeds a third threshold time period.

18. A heating, ventilation, and/or air conditioning (HVAC) system, comprising:

a compressor; and a controller communicatively coupled to the compressor and comprising a tangible, non-transitory, computer-readable medium with computer-executable instructions that, when executed by processing circuitry, cause the processing circuitry to:

determine that an input voltage value of an input voltage received as a power supply by the HVAC system is outside of a range of voltage values;

in response to a determination that the input voltage value is outside of the range of voltage values:

identify a voltage variation event in response to a determination that monitor a duration of time during which the input voltage value is outside of the range of voltage values is greater than a first threshold time period; and identify the voltage variation event in response to a determination that the input voltage value trends away from the range of voltage values for a second threshold time period; and operate the HVAC system in a de-rated operating mode to enable conditioning of an air flow in response to identifying the voltage variation event.

19. The HVAC system of claim 18, wherein the computer-executable instructions, when executed by the processing circuitry, cause the processing circuitry to operate the compressor at a de-rated nominal capacity, to operate the compressor at a predetermined stage, to suspend operation of the HVAC system and restart the operation of the HVAC system after an anti-short cycle delay period, or any combination thereof upon initialization of the de-rated operating mode.

20. The HVAC system of claim 18, wherein the HVAC system is configured to electrically couple to a power source, and the HVAC system is configured to receive the input voltage from the power source.

* * * * *